April 10, 1951 H. F. OLSON 2,548,235

TRANSFORMERLESS AUDIO OUTPUT SYSTEM

Filed March 13, 1947 4 Sheets-Sheet 1

INVENTOR
HARRY F. OLSON.
BY H. S. Grover
ATTORNEY

INVENTOR
HARRY F. OLSON.
BY H. G. Grover
ATTORNEY

TRANSFORMERLESS AUDIO OUTPUT SYSTEM

Filed March 13, 1947

INVENTOR
Harry F. Olson.
BY H. G. Grover
ATTORNEY

April 10, 1951 H. F. OLSON 2,548,235

TRANSFORMERLESS AUDIO OUTPUT SYSTEM

Filed March 13, 1947 4 Sheets-Sheet 4

INVENTOR
HARRY F. OLSON.
BY H. G. Grover
ATTORNEY

Patented Apr. 10, 1951

2,548,235

UNITED STATES PATENT OFFICE 2,548,235

TRANSFORMERLESS AUDIO OUTPUT SYSTEM

Harry F. Olson, Princeton, N. J., assignor to Radio Corporation of America, a corporation of Delaware Application March 13, 1947, Serial No. 734,489

3 Claims. (Cl. 179—1)

My present invention relates generally to audio frequency amplifier systems, and more particularly to an improved audio amplifier system in which the power amplifier tube is coupled directly to the voice coil of a dynamic loud-speaker without the use of a transformer.

In the conventional audio amplifier system employing a dynamic loud-speaker, a transformer is used to couple the relatively high impedance of the output tube to the relatively low impedance of the speaker voice coil. To obtain low distortion and good response at the low audio frequencies there is required a large and costly coupling transformer. Furthermore, a considerable part of the power output is dissipated in the transformer. The coupling transformer can be eliminated if the plate impedance of the output tube is lowered, and the impedance of the voice coil is increased. It is quite feasible to wind a voice coil that can be coupled to a vacuum tube having a low impedance. There are additional advantages to be secured by such an arrangement. The amplifier system will operate at a low direct current voltage so that it is possible to eliminate the usual power supply transformer. The use of a low direct current voltage, in turn, reduces the cost of filter condensers. In brief there are advantages from the standpoints of cost, fidelity and efficiency.

It is, therefore, an important object of my present invention to provide a transformerless audio frequency output system in which an output tube is coupled directly to the voice coil of dynamic loud-speaker without the use of a transformer, the non-linear distortion, power loss and frequency discrimination introduced by the usual audio frequency output transformer being thereby eliminated.

Another important object of my invention is to provide a transformerless audio output circuit thereby to provide a reduction in cost due to elimination of the usual audio output transformer; the power supply transformer being eliminated as well, because the present system operates at so low an impedance as to require a relatively low supply voltage and high current. Under these conditions, it is possible to obtain sufficient direct current voltage output by direct rectification of the alternating energizing current without stepping up to a high voltage, as would be the case in a high impedance system.

It is another important object of my present invention to provide a transformerless audio output system wherein push-pull connections are employed in the output stage.

Another object of the invention is to associate a phase inverter with the voice coil of a dynamic type of loud-speaker whereby push-pull connections can be made to the voice coil.

Still another object of my invention is to provide a single-ended audio frequency amplifier which directly drives the voice coil of a speaker, the latter employing mechanical counterbalance means for uni-directional force.

A more specific object of my invention is to provide an audio amplifier system whose direct current energizing voltages are provided by solenium rectifiers employed to provide rectified alternating current voltage for the plates and grids of the tubes of the system, and no transformer being employed in the power supply circuit.

A further object of my invention is to provide an audio output stage wherein the voice coil of a dynamic speaker is inserted in the common cathode circuits of push-pull connected tubes thereby to provide a novel transformerless drive circuit for the speaker.

More specific objects are to provide novel dynamic speaker constructions.

Still other features and objects of my invention will best be understood by reference to the following description, taken in connection with the drawings, in which I have indicated diagrammatically several circuit organizations whereby my invention may be carried into effect.

Figures 1, 2:
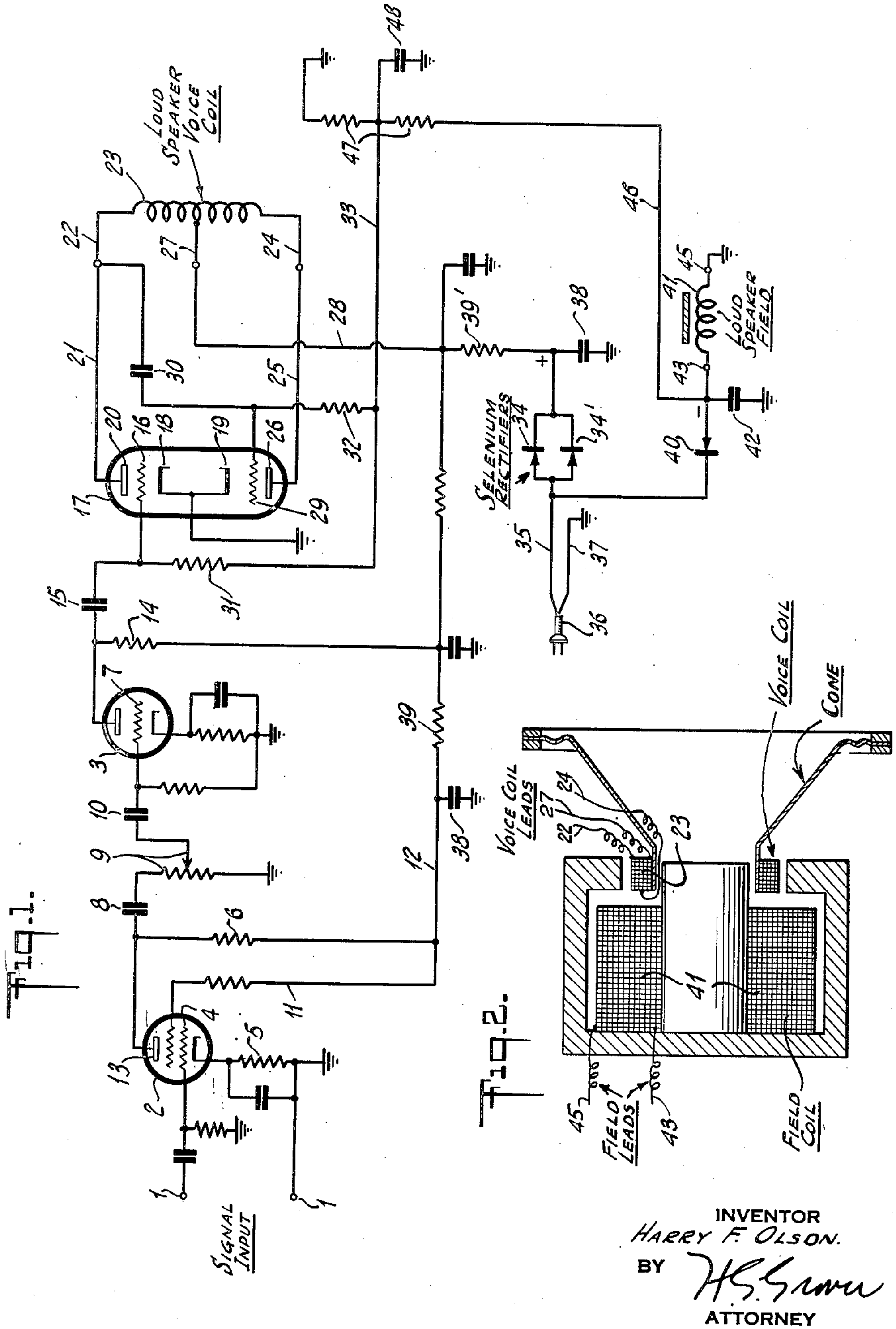
Fig. 1 shows a preferred circuit embodiment to secure the advantages of my transformerless audio output.
Fig. 2 shows a schematic cross-sectional view of a loud-peaker which may be used in the circuit of Fig. 1.

Referring now to the accompanying drawings, wherein like reference characters in the different figures denote similar elements, there is shown in Fig. 1 an audio frequency signal amplifier system embodying various features of my invention. The audio signal input terminals 1 may be connected to any suitable source of audio frequency energy. For example, such a source can be the detector output terminals of a radio receiver, the electrical pickup of a phonograph, the microphone of a public address system, or any other known source. The audio frequency signals are preferably amplified by any suitable cascaded amplifier stages. I have shown amplifier tube 2 as a screen grid tube, say of the 6J7 type, feeding a 6J5 type triode amplifier tube 3. The control grid 4 of tube 2 is self-biased by virtue of the usual by-passed cathode bias resistor 5. The audio signals are applied to grid 4, and the amplified signal voltage across plate resistor 6 is applied to grid 7 of amplifier tube 3 through coupling condenser 8, volume control potentiometer 9 and condenser 10. The screen grid of tube 2 includes a direct current energizing voltage connection 11 to the power supply line 12. Plate resistor 6 is included in the energizing connection from line 12 to the plate 13.

The plate resistor 14 of amplifier tube 3 is connected to energizing line 12, the control grid 7 being biased by the voltage drop across the usual by-passed cathode resistor. Audio signal voltage developed across plate resistor 14 is applied through coupling condenser 15 to the control grid 16 of one triode section of a twin triode tube. The latter is of the 6AS7 type, and comprises a pair of triode electron sections. The cathodes 18 and 19 of the two sections are connected in common and grounded. The plate 20, under control of grid 16, is connected by lead 21 to lead 22 at one end of the voice coil 23 of a dynamic loud-speaker. The opposite end of voice coil 23 is provided with a lead 24 which is connected by lead 25 to plate 26 of the second triode section of tube 17. The center lead 27 of voice coil 23 is connected by lead 28 to the power supply line 12 whereby plates 20 and 26 have positive voltage applied thereto.

The control grid 29, located between cathode 19 and plate 26, is coupled by condenser 30 to lead 22 of the voice coil. The tube 17 for this circuit application had an amplification factor of 2.2. Under these conditions appropriate voltages are obtained by connecting the grid to the end of the voice coil. If the amplification factor of the tube were higher another tap would have to be provided in order to obtain the appropriate voltage on grid 29, that is the same as grid 16. Negative bias for both control grids 16 and 29 is provided by connecting each of them through respective resistors 31 and 32 and common lead 33 to a suitable point of negative direct current voltage. It will now be seen that the voice coil 23 is inserted directly in the common plate circuit of both triode sections of tube 17, the voice coil acting as a push-pull output load for tube 17. The coil 23 is constructed to have an impedance matching the relatively low plate impedance of tube 17. While a twin triode 6AS7 tube is shown used as the output tube 17, it is to be clearly understood that separate triode tubes may be utilized. The important thing is to employ output tubes whose plate impedances are sufficiently low, of the order of 300 ohms, to match the low impedance of coil 23. The usual output transformer is thereby eliminated from between the output tube and the voice coil.

Since the amplifier system will operate at a low direct current voltage the usual power supply transformer is eliminated. In turn, there is secured reduced cost of filter condensers. As an additional feature of my invention, selenium rectifiers 34, 34′ are employed to supply the high voltage direct current. The pair of rectifiers 34 and 34′ are connected in parallel, with the common negative terminal connected to the high potential conductor 35 of the alternating current power line 36. It is assumed that a 110 volt alternating current source is employed. The grounded conductor 37 returns through ground to the cathode circuits of all of tubes 2, 3 and 17. The common positive terminal of rectifiers 34 and 34′ is connected to supply line 12.

Condensers 38 are provided at suitable points of energizing line 12 to cooperate with series resistors 39, 39′ to provide filtering of the rectified alternating current voltage. A separate selenium rectifier 40 is connected across conductors 35 and 37 to provide rectified voltage for the loud-speaker field coil 41, and to supply negative bias for the bias lead 33. The field coil 41 is connected in circuit with the rectifier 40 between the negative terminal thereof and ground. Condenser 42 by-passes the terminal 43 of field coil 41 to ground, while the opposite terminal 45 is grounded. The negative terminal 43 is connected by lead 46 to lead 33. Resistors 47 and condenser 48 provide filtering of the grid bias voltage prior to application to grids 16 and 29.

In Fig. 2 I have shown a schematic cross-sectional diagram of the loud-speaker driven by the output tube 17. It will be observed that the construction of the dynamic loud-speaker is entirely conventional in nature, except for the fact that the field leads 43 and 45 of the field coil 41 are connected respectively to the negative terminal of selenium rectifier 40 and ground. Further, the construction of the loud-speaker differs from the usual practice of the prior art in that the voice coil 23 has the midlead 27 and its opposite end leads 22 and 24 connected as shown in Fig. 1. It is not believed necessary to discuss the constructional terms of the loud-speaker, other than by reference to the schematic drawing of Fig. 2.

It is quite feasible to wind the voice coil 23 so that its impedance will be sufficiently high to match the plate impedance of the low mu triodes of tube 17. For example, the plate impedance of each triode element of tube 17 is about 280 ohms. The voice coil 23 is wound so as to have an impedance of about 600–700 ohms, preferably the higher value. The voice coil should not be too heavy for good response in the high audio frequency range, and, for example, the mass of the coil can be about 3.5 grams. The flux density in the air gap can be about 10,000 gausses. The operation of the output stage is a type of class A—B. With a steady current of 50 milliamperes, the power input to the voice coil 23 with 10% distortion is about 2 watts, while with 75 milliamperes the power output would be about 4 watts. Comparing the power output of the present system with that of the conventional transformer arrangement, 4 watts in the present system will produce as much sound output as 8 watts in the conventional transformer coupled speaker.

The tube 17 has its triode section 19, 29, 26 function as a phase inversion stage. This is accomplished by applying the plate voltage at lead 22 to the grid 29 for a phase reversal. Hence, the output circuit of tube 17 is connected in push-pull fashion. As a result there is no net unbalanced force in the voice coil 23, if the currents in the two sections of the voice coil are exactly the same. It is pointed out that an unbalanced current of 5 milliamperes could be tolerated, because it would not be disturbing since the deflection of the loud-speaker would be only 1/20 of an inch.

Actual comparison tests between the present transformerless loud-speaker system and the conventional radiophonograph combination of a reliable type using a transformer coupling to the voice coil, reveals that the efficiency of the transformerless system was about 2 decibels (db.) higher. Furthermore, there is a marked improvement in the low audio frequency range, and it is pointed out that this is a marked contrast to the audio amplifier system of conventional radio receivers which suffer from a lack of clean output in the low audio frequency range.

There is not only a reduction in cost by the elimination of the output transformer, but the elimination of the power supply transformer additionally provides economy of construction. Since the system is of a low impedance it means that the direct current supply voltage will be relatively low and the current relatively high. Under these conditions it is best to obtain sufficient output by direct rectification of the 110 volts alternating current supply without stepping up to a high voltage as would be the case in a high impedance system. The use of a relatively low supply voltage also results in a reduction in cost due to the lower voltage rating for the electrolytic condensers. The selenium rectifiers which are employed are particularly suited for a low voltage system. However, it is to be clearly understood that the selenium rectifier may be replaced by rectifier tubes if desired.

Figure 3:
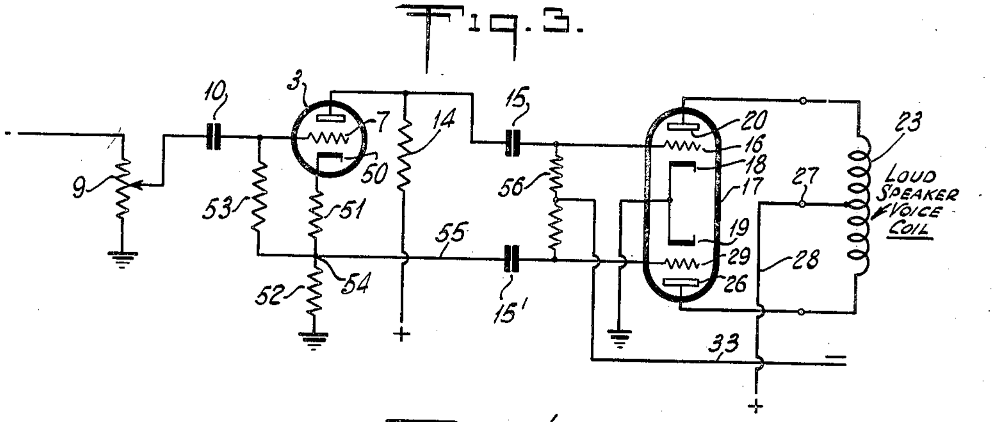
Fig. 3 shows a modification of a portion of the circuit of Fig. 1, wherein a single triode is used for phase inversion prior to the push-pull output stage.
Figure 4:
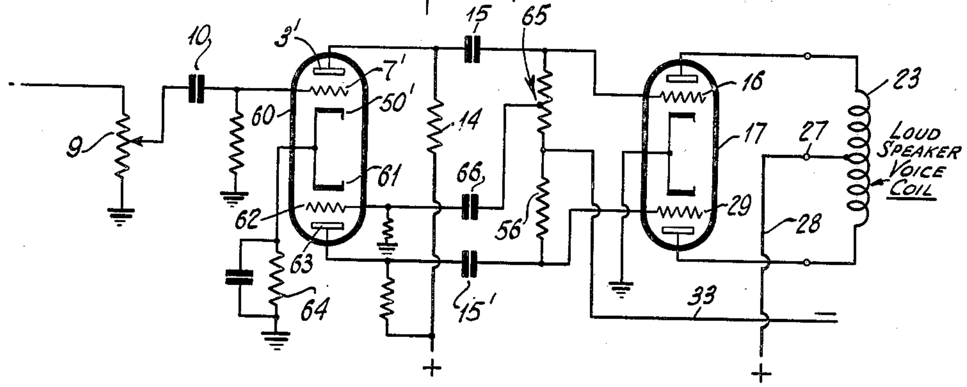
Fig. 4 is a further modification of Fig. 3, showing a double triode employed for phase inversion.

My invention is not limited to the utilization of one of the triodes of output 17 as the phase inversion tube, although the latter is a feature of the invention. In Figs. 3 and 4 I have shown modifications of the output stage and the preceding amplifier stage to show other arrangements for securing phase inversion so as to operate the tube 17 as a push-pull stage. In Fig. 3 the triodes of tube 17 are driven in push-pull fashion by virtue of the connection of amplifier tube 3 as a phase inversion tube. It will be understood that the connections from the circuit shown in Fig. 3 to the remaining circuit elements of Fig. 1 are exactly the same as in the case of the latter. Hence, the description of Fig. 3 is restricted to those elements which are not shown in Fig. 1.

The tube 3 has its cathode 50 connected to ground through a pair of resistors 51 and 52 which are arranged in series. The control grid 7 is connected to the junction of resistors 51 and 52 by the grid leak resistor 53. The junction point 54 is connected by lead 55 and coupling condenser 15′ to the control grid 29 of the triode section 19, 29, 26 of tube 17. As in the case of Fig. 1, the control grid 16 of the triode section 18, 16, 20 is connected by condenser 15 to the plate of tube 3. The control grids 16 and 29 are connected to the opposite ends of resistor 56 whose mid-point is connected by the lead 33 to the source of negative bias which, as shown in Fig. 1, is the power supply lead 46. It will, therefore, be seen that in the case of Fig. 3 the push-pull operation of the triodes of tube 17 is provided by connecting tube 3 to function as a phase inversion stage for the triode section 19, 29, 26. It will be recognized that at the plate of tube 3 and at the junction point 54 the alternating voltages are in phase opposition, which permit the grids 16 and 29 to be driven push-pull.

In Fig. 4 the triodes of tube 17 are driven in push-pull manner in a different fashion from Fig. 3. Here, an auxiliary triode is utilized as the phase inversion device. The tube preceding tube 17 is designated by the numeral 60, and is shown as embodying two triode sections. One of these triode sections 50′, 7′, 3′ functions in the same manner as the amplifier tube 3 of Fig. 1. The second triode section of tube 50 consists of the cathode 61, control grid 62 and anode 63. The cathodes 50′ and 61 are connected in common to ground by a by-passed grid bias resistor 64, the grid 62 being returned to the grounded end of bias resistor 64. The control grid 7′ has audio voltage applied to it through the condenser 10, while the control grid 62 has alternating voltage applied to it from a tap 65 on the upper section of the tapped resistor 56. The condenser 66 couples tap 65 to grid 62. The control grid 29, which is connected to plate 63 through condenser 15′, is driven in push-pull relation to grid 16. Otherwise the circuit functions in a manner similar to that shown in Figs. 1 and 3.

Figure 5:
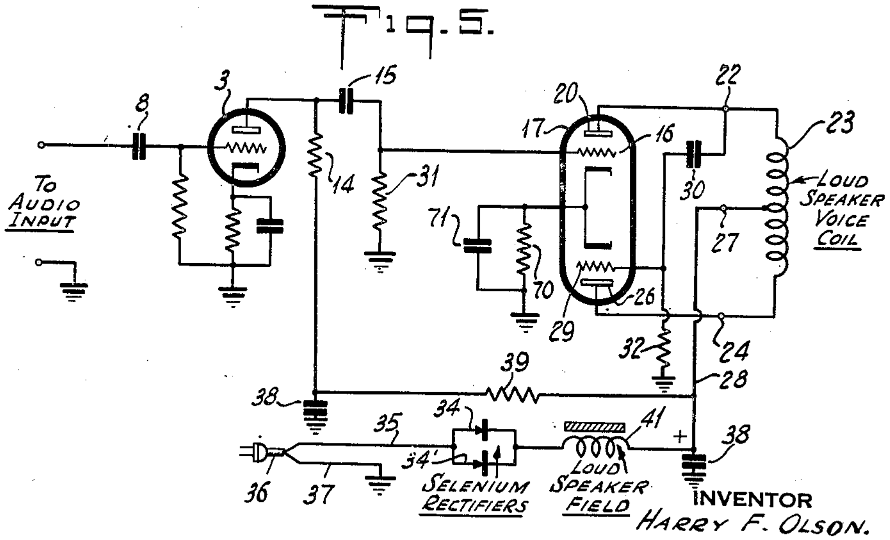
Fig. 5 illustrates another modification wherein self-bias is used for the control grids of the push-pull output tubes.

It is not, of course, essential that the control grids of the output tube 17 be biased negatively by the separate selenium rectifier 40 shown in Fig. 1. In Fig. 5 I have shown a modification of the arrangement shown in Fig. 1, wherein the grid 29 secures its negative bias by virtue of the voltage drop across the biasing resistor 70 arranged in the common cathode circuit of the two triodes of tube 17. Biasing resistor 70 is by-passed by condenser 71, and the grid 29 is returned to the grounded end of bias resistor 70 by the grid resistor 31. The loud-speaker field coil 41 is arranged between energizing lead 28 and the common positive terminal of the selenium rectifiers 34 and 34′. In other words, in Fig. 5 I have eliminated the auxiliary selenium rectifier 40 and its associated supply circuit connections, and have inserted the loud-speaker field coil in the main supply circuit. Otherwise the circuit arrangement of Fig. 5 is similar to that shown in Fig. 1, it being pointed out that one of the triodes 17 is used as a phase inversion device.

Figure 6:
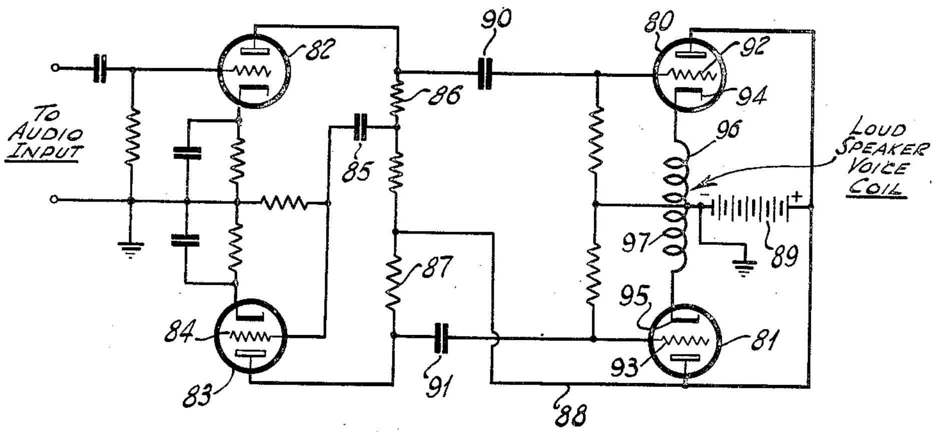
Fig. 6 shows a further modification wherein the voice coil is inserted in the cathode circuits of the push-pull tubes.

In Fig. 6 I have shown a further modification, wherein the loud-speaker voice coil is placed in the common cathode circuits of the push-pull output tubes. Here, again, a push-pull connection is used so that the large steady forces in the voice coil are balanced out. The circuit of Fig. 6 uses the arrangement of Fig. 4 to provide phase inversion to feed the output tubes 80 and 81 in push-pull. Thus, the amplifier 82 has associated with it the phase inversion tube 83 whose control grid 84 is connected through condenser 85 to a tap on the plate resistor 86. The plate resistors 86 and 87 of tubes 82 and 83 have the junction thereof connected by lead 88 to the positive terminal of the direct current supply source 89. The coupling condensers 90 and 91, which are respectively connected to the respective plates of tube 82 and 83, are respectively connected to the control grid of output tubes 80 and 81.

The cathodes 94 and 95 of tubes 80 and 81 respectively are each connected to ground through a half section of the voice coil. Thus, the junction of the voice coil sections 96 and 97 is grounded, and is, also, connected through respective grid resistors to the control grids 92 and 93. It can be shown that as far as the load is concerned the negative feedback of each of tubes 80 and 81 causes each respective tube to act as a cathode follower. Assuming that each of triodes 80 and 81 has a plate resistance of 8000 ohms and an amplification factor of 20, the load resistance which matches the tube resistance in the cathode circuit will be 380 ohms. It is quite feasible to wind a voice coil to match this impedance. It will, therefore, be appreciated that the arrangement shown in Fig. 6 provides a transformerless cathode follower output system.

Figure 7:
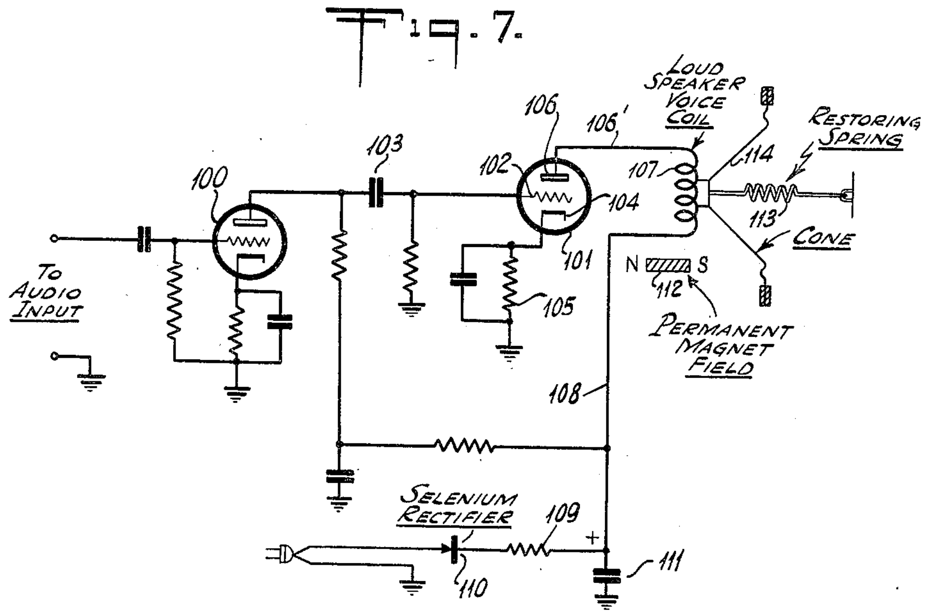
Fig. 7 is a schematic circuit diagram of a single-ended transformerless output system.

My invention is not restiricted to the insertion of the loud-speaker voice coil in the plate circuit of a pair of push-pull connected output tubes. A single-ended output stage may be employed, as shown schematically in the circuit arrangement of Fig. 7. In this circuit arrangement the audio input signals are applied to an amplifier tube 100 connected in suitable manner to amplify audio signals. The amplified audio signals are applied to the output amplifier tube 101 by connecting the control grid 102 through coupling condenser 103 to the plate of tube 100. The cathode 104 of tube 101 is connected to ground through a suitably by-passed bias resistor 105. The plate 106 is connected through the loud-speaker voice coil 107 and lead 108 and filter resistor 109 to the positive terminal of selenium rectifier 110. A single rectifier is employed in this case, the condenser 111 by-passing alternating components to ground. The plate of tube 100 is positively energized from lead 108, and includes suitable filter elements.

The permanent magnet of the loud-speaker is schematically designated by numeral 112, and I have shown a restoring spring 113 arranged to overcome the steady force in the voice coil 107. It is to be clearly understood that the representations of the voice coil 107 and the cone 114 is purely schematic. Since the output stage is single-ended, there is a large unbalanced force due to the steady current flowing through the voice coil 107. It is necessary to use a deformed spring 113 to overcome the steady force in the voice coil. Of course, the voice coil 107 is constructed so as to match the low plate impedance of output tube 101.

Figure 8:
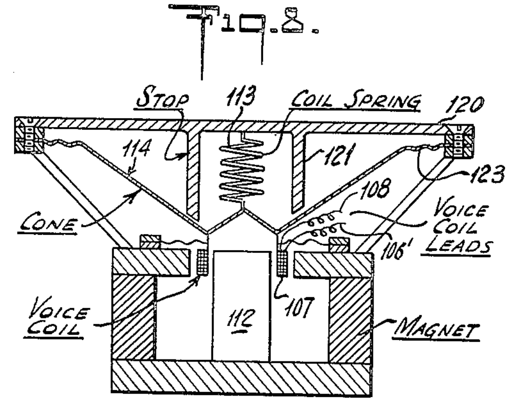
Fig. 8 is a schematic cross-sectional view of the loud-speaker employed in the single-ended system of Fig. 7.
Figure 10:
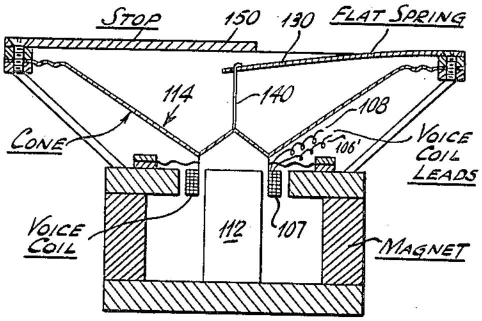
Fig. 10 is a schematic cross-sectional view of a modification of the speaker of Fig. 8.
Figure 9:
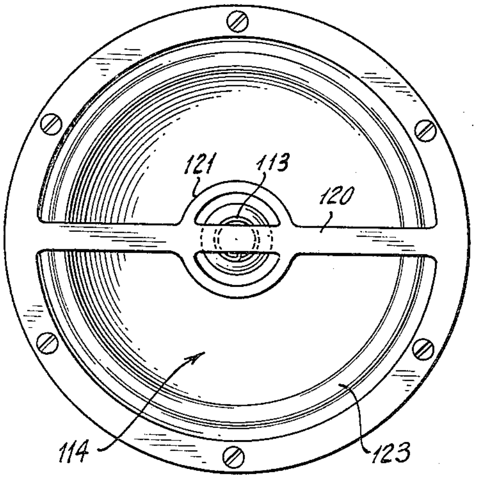
Fig. 9 is a top view of the speaker of Fig. 8.

In Figs. 8 and 10 I have shown schematic cross-sectional views of respectively different loud-speaker arrangements employing the spring to overcome the steady force due to the steady current in the voice coil. Referring to the speaker construction of Fig. 8, of which Fig. 9 shows a plan view looking into the cone 114, it will be seen that the voice coil 107, whose opposite ends are connected to leads 108 and 106′, is centered about the upper end of the permanent magnet of pole piece 112. The coil spring 113 has its upper end secured to the cross arm 120, and there projects from the cross arm 120 a stop 121 in whose interior the coil spring is located. By giving a predetermined deformation or stretch to the spring 113 the coil 107 will be centered in the air gap, because the spring counteracts the force due to the steady current flowing through the coil 107. The compliant cone portions 123, shown as the conventional flexible corrugations, keep the coil centered in the gap. When there is no current flowing, that is tube 101 is unexcited, spring 113 will produce a large deflection and deform the compliant portions 123. For this reason, and to obviate this undesirable condition, the stop 121 is provided.

Figure 11:
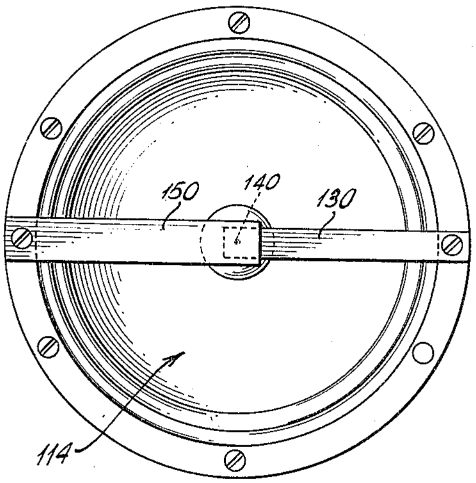
Fig. 11 is a top view of the speaker of Fig. 10.

The cross-sectional view of Fig. 10 shows the voice coil 107 centered in the air gap of the pole piece 112. The cone 114 in this case utilizes a flat spring 130 to provide the normal neutralization of the steady force of the voice coil 107. The flat spring has one end thereof fixed, while its free end is connected by a suspension wire 140 to the center of cone 114. The flat spring 130 is provided with a stop 150, the latter being provided by a strip of metal having one end fixed while its free end overlaps the free end of flat spring 130. Fig. 11 shows a plan view of the speaker of Fig. 10 looking into the cone 114. The modification shown in Figs. 10, 11 functions in the manner similar to the arrangement of Figs. 8, 9.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. In a signal amplifying and transducing system for supplying sound signals corresponding to electrical signals: electron-discharge-tube amplification means including a final amplification stage having anode, cathode and control electrodes an input circuit, including a ground connection, coupling said control electrode to a source of electrical signals to be amplified and converted to sound signals; electro-acoustic transducing means connected at low D.-C. potential to said final amplification stage for converting electrical signals, amplified by said final stage, into sound signals; said transducing means including movably positioned windings connected to carry signal currents and move in response to the variations in these signal currents; said windings being directly connected in series between said cathode and ground connection in degenerative relation in the final amplification stage as its output load to eliminate signal distortion and losses due to transformer couplings.

2. In an electro-acoustic transducer apparatus for transforming varying electrical signals to corresponding sound vibrations: magnetic field structure for generating a substantially constant magnetic field; windings for carrying the electrical signals and generating magnetic flux variation corresponding to the signal vibrations; supporting means holding said windings in a vibratable equilibrium position in said magnetic field for causing said generated flux variations to exert correspondingly varying forces tending to vibrate the windings with respect to said equilibrium position; acoustic means connected to said windings for delivering sound vibrations corresponding to the vibrations of the windings; said supporting means including vibratable bias structure connected to the windings for urging them toward an idle rest position displaced from the equilibrium position when the windings are idle; said bias structure exerting a force on the windings sufficient to approximately balance opposing forces, generated when the windings carry direct current, for assuring that the windings are in the equilibrium position when the apparatus is in use and the windings are carrying electrical signals superimposed on a direct current.

3. In an electro-acoustic transducer apparatus for connection to an electron-discharge electrical signal amplification stage and transforming the amplified signal output of said stage to sound vibrations: magnetic field structure for generating a substantially constant magnetic field; windings for connection in the electron-discharge circuit of the electron discharge amplification stage to carry the direct current of said electron discharge circuit as well as signal variations of said current; said windings being arranged to generate magnetic flux variations corresponding to signal variations of said discharge current; supporting means holding said windings in a vibratable equilibrium position in said magnetic field for vibration in response to forces developed by said flux variations; said supporting means including bias structure connected to said windings and biasing them toward an idle rest position displaced from the equilibrium position for supporting the windings in equilibrium position when the windings are carrying the electron discharge current and are subjected to displacing forces because of the flux generated by the D. C. component of the electron discharge current.

HARRY F. OLSON.

REFERENCES CITED

The following references are of record in the file of this patent:

UNITED STATES PATENTS

| Number | Name | Date |
|---|---|---|
| 1,784,486 | Farrand | Dec. 9, 1930 |
| 1,873,360 | Swallow | Aug. 23, 1932 |
| 1,925,659 | Giles | Sept. 5, 1933 |
| 1,937,602 | Stewart | Dec. 5, 1933 |
| 2,383,846 | Crawley | Aug. 28, 1945 |

OTHER REFERENCES

R. C. A. Receiving Tube Manual, 1937 edition, pps. 184 and 185.

R. C. A. Victor Service Data, vol. II, 1938–1942, page 98–C TRK–5, TT–5.